March 3, 1970
W. P. HILL
3,498,167
AUTOMATIC PRECISION NUMERICAL CONTROLLED PUNCHING
AND SHEARING MACHINE
Filed Feb. 19, 1968
4 Sheets-Sheet 1
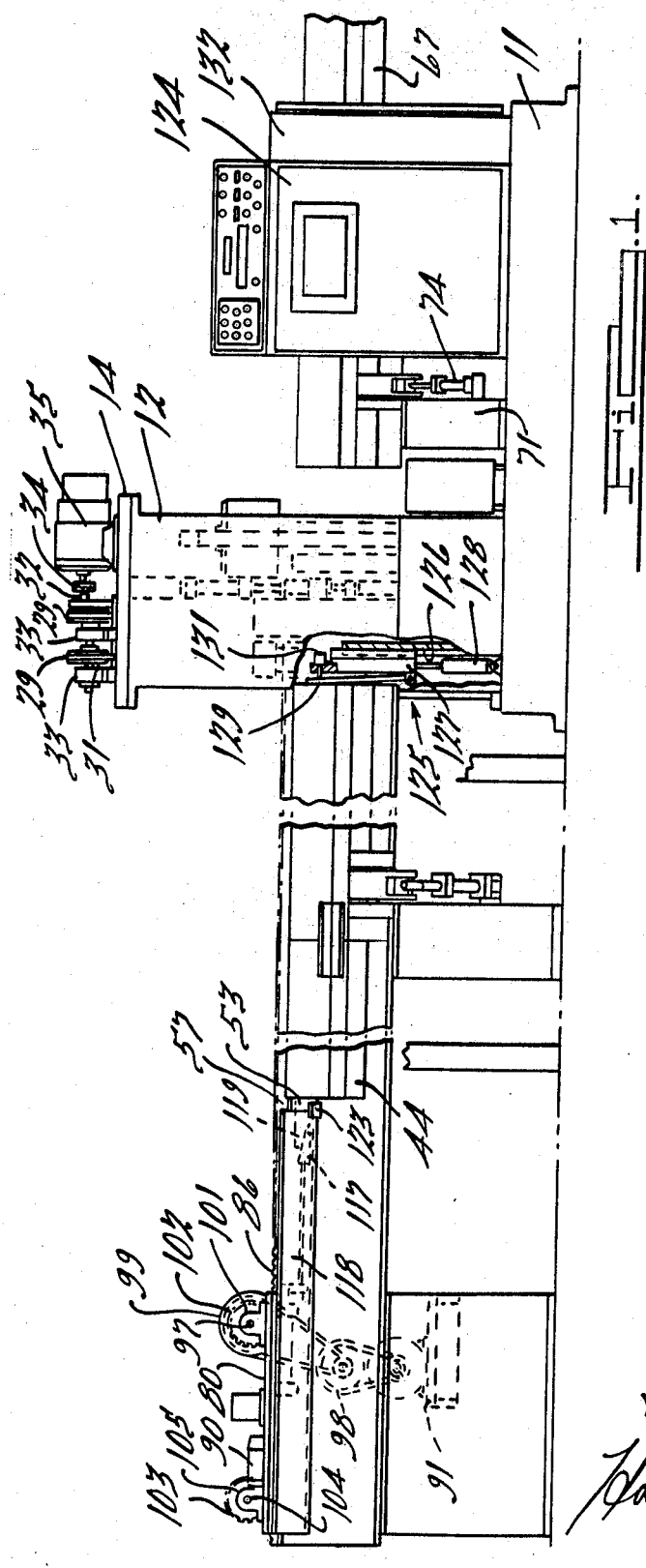
INVENTOR
Walter P. Hill
BY
Harness, Dickey & Pierce
ATTORNEYS.

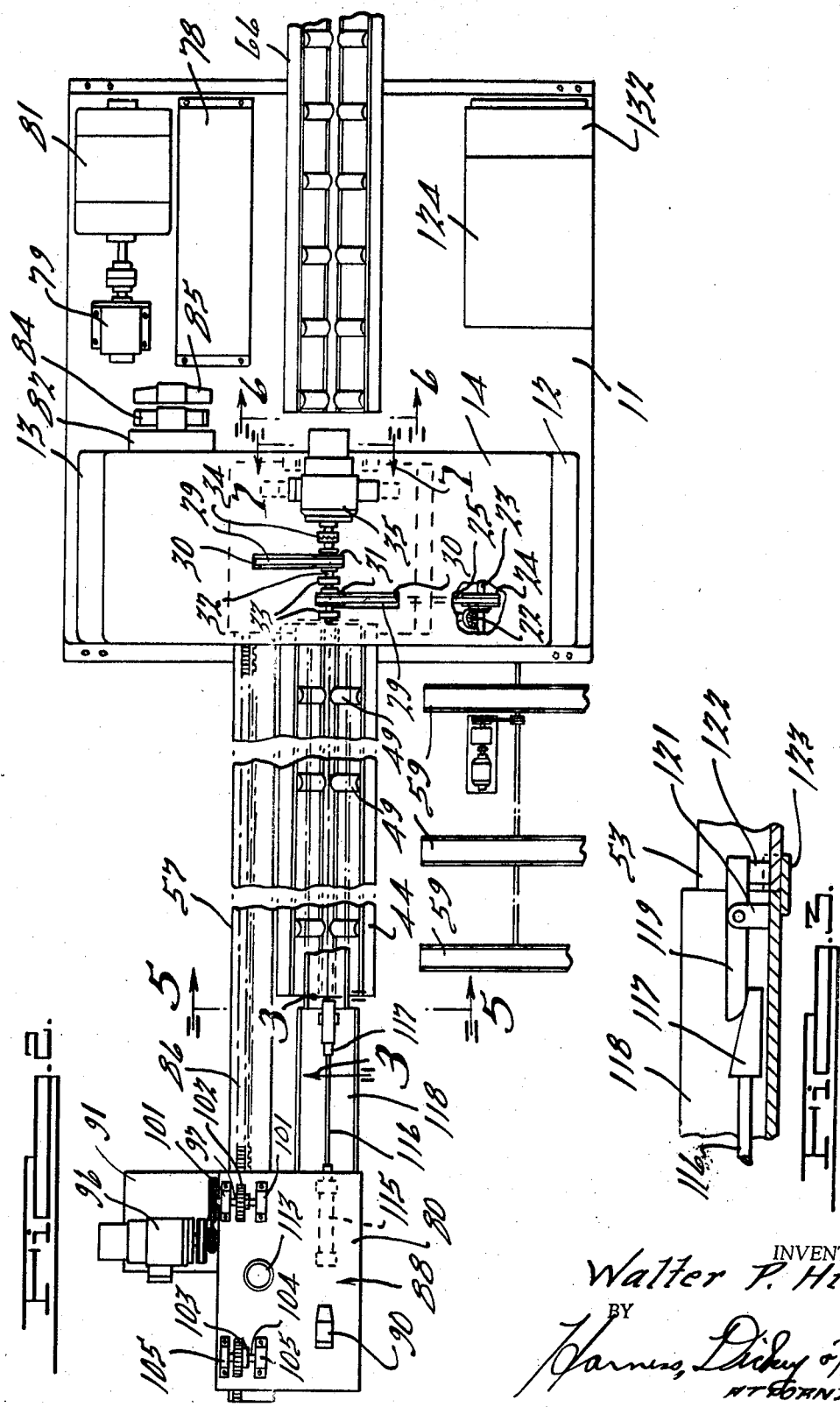

INVENTOR
Walter P. Hill
BY
Harness, Dickey & Pierce
ATTORNEYS.

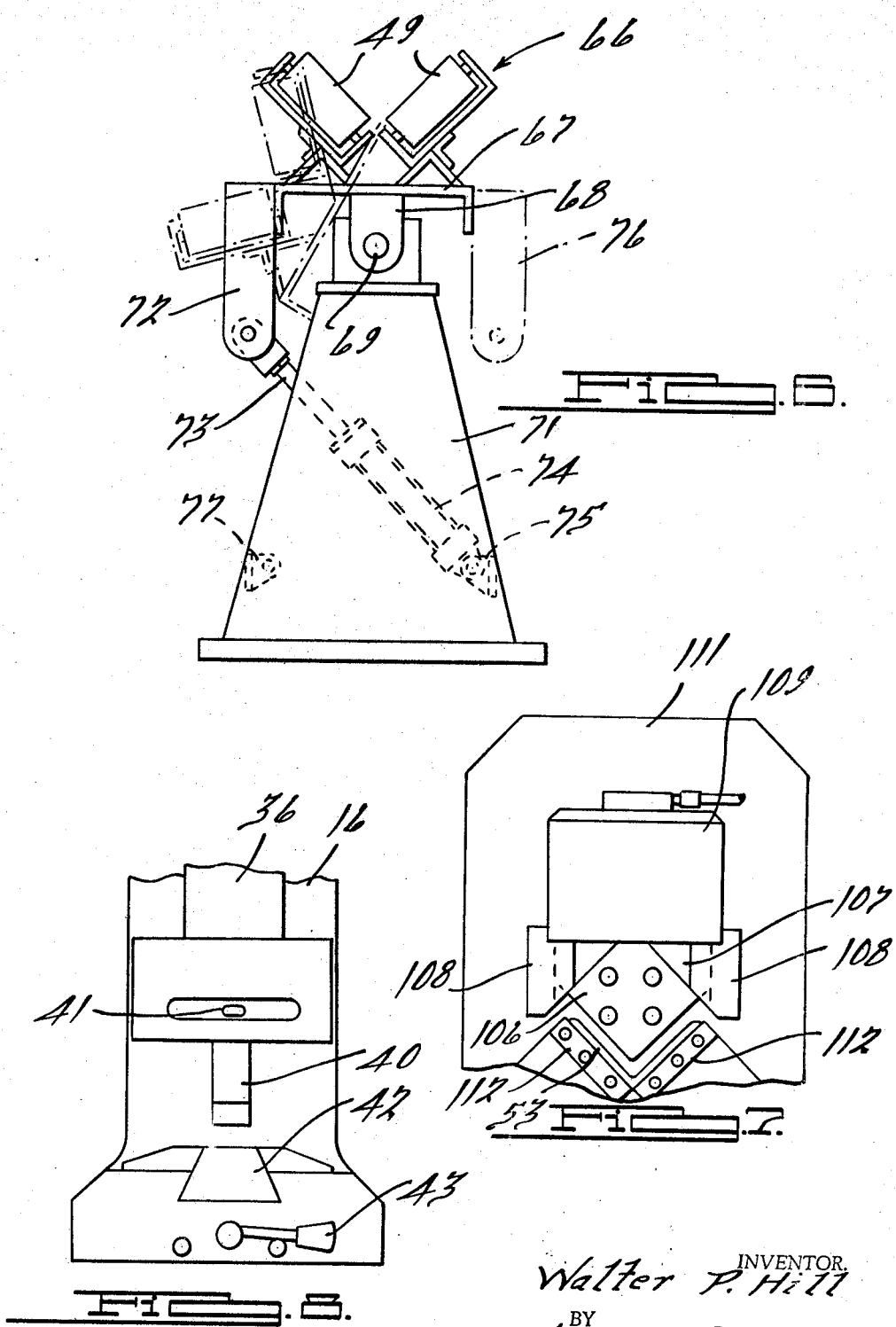

United States Patent Office 3,498,167
Patented Mar. 3, 1970

3,498,167
AUTOMATIC PRECISION NUMERICAL CONTROLLED PUNCHING AND SHEARING MACHINE
Walter P. Hill, Bloomfield Hills, Mich., assignor to Walter P. Hill Inc., Troy, Mich., a corporation of Michigan
Filed Feb. 19, 1968, Ser. No. 706,533
Int. Cl. B26d 5/30
U.S. Cl. 83—71                 10 Claims

ABSTRACT OF THE DISCLOSURE

The automatic precision punch and shearing machine is herein illustrated as operating on angle stock through a sequence of operations programmed by a tape or other numerical controlled device. The workpiece is automatically advanced to a roller conveyor where it is secured by an advancing device which moves the workpiece against a retractable stop to set a zero from which sequential punching and shearing of pieces to predetermined lengths is initiated. The pieces are advanced along a similar roller conveyor from which they are ejected by the tilting thereof.

BACKGROUND OF THE INVENTION

It is old in the art to feed angle members into punches and through a shear device after the punching operation at predetermined points in the legs of the angle workpiece some of the operations being controlled by stop elements conventionally employed in the art.

SUMMARY OF THE INVENTION

The machine has a central section containing a pair of punching devices, one for each leg, which are supported for adjustment along the leg width. A shear is mounted on the central section beyond the punches which severs a length from the stock after punching operations thereon. Either side of the central section a roller conveyor is provided with the rollers located at 45° each side of a central plane to carry lengths of angle stock with the legs disposed upwardly. The roller conveyors are pivotally mounted and actuated by rams so that they can be tilted for receiving a new length of stock to be worked upon and for ejecting the cut sections after the punching and shearing operations.

The machine is inexpensive, rugged, maintenance-free, requiring no setup time for different sizes or lengths of angles. The only change necessary is that for different tapes, punches and lettering when lettering is used for marking. The production planning and engineering is incorporated in the tape to cause the machine to operate as follows: The lengths of angles are stored on a rack and are moved seriatim towards and to loading position in the conveyor which is then rotated to V-leg up position. The machine operates automatically when the tape is in read position and the cycle start push button is closed by the operator.

A carriage moves forwardly to engage and clamp the length of angle stock to be worked upon, advancing the forward end to a zero position where a plunger is operated. This movement automatically resets both the horizontal axis along the length of the angle stock and the vertical axis along the legs of the angle to zero.

The plunger carrying device is retracted to permit the length of angle stock to be advanced to have the forward edge sheared to accurate shape. The punches are located relative to the legs and the holes are punched seriatim until a desired length has passed beneath the shear when the shear will cut the length from the original piece. The small lengths, such as clip angles and the like, up to 24 inches in length drop off ahead of the conveyor into a tote pan while the longer lengths are advanced to the discharge conveyor which is tilted when necessary to eject the finished pieces therefrom. Thereafter the clamp is released and the carraige returns to its initial position to receive a new length of angle stock. The foremost angle stock on the storage rack will be advanced onto the conveyor which had been tilted to receiving position and the above cycle will be repeated. When angle stock of different dimensions is to be processed having different locations and sizes of holes to be punched, the tape can readily be changed along with the punches and dies as well as the lettering if required to mark the pieces so that punched lengths can be automatically processed from the different and varying lengths of angle stock.

BRIEF DESCRIPTION OF THE DRAWINGS

FIGURE 1 is a broken view in elevation of the machine of the present invention;

FIG. 2 is a plan view of the machine illustrated in FIG. 1;

FIG. 3 is an enlarged broken sectional view of the structure illustrated in FIG. 2, taken on the line 3—3 thereof;

FIG. 6 is a sectional view of the structure illustrated in FIG. 2, taken on the line 6—6 thereof;

FIG. 7 is a broken view of the structure illustrated in FIG. 2, as viewed from line 7—7 thereof, and FIG. 8 is an enlarged broken view of the structure illustrated in FIG. 4, as viewed from the point 8 thereof.

DESCRIPTION OF THE PREFERRED EMBODIMENT

Figure 4:
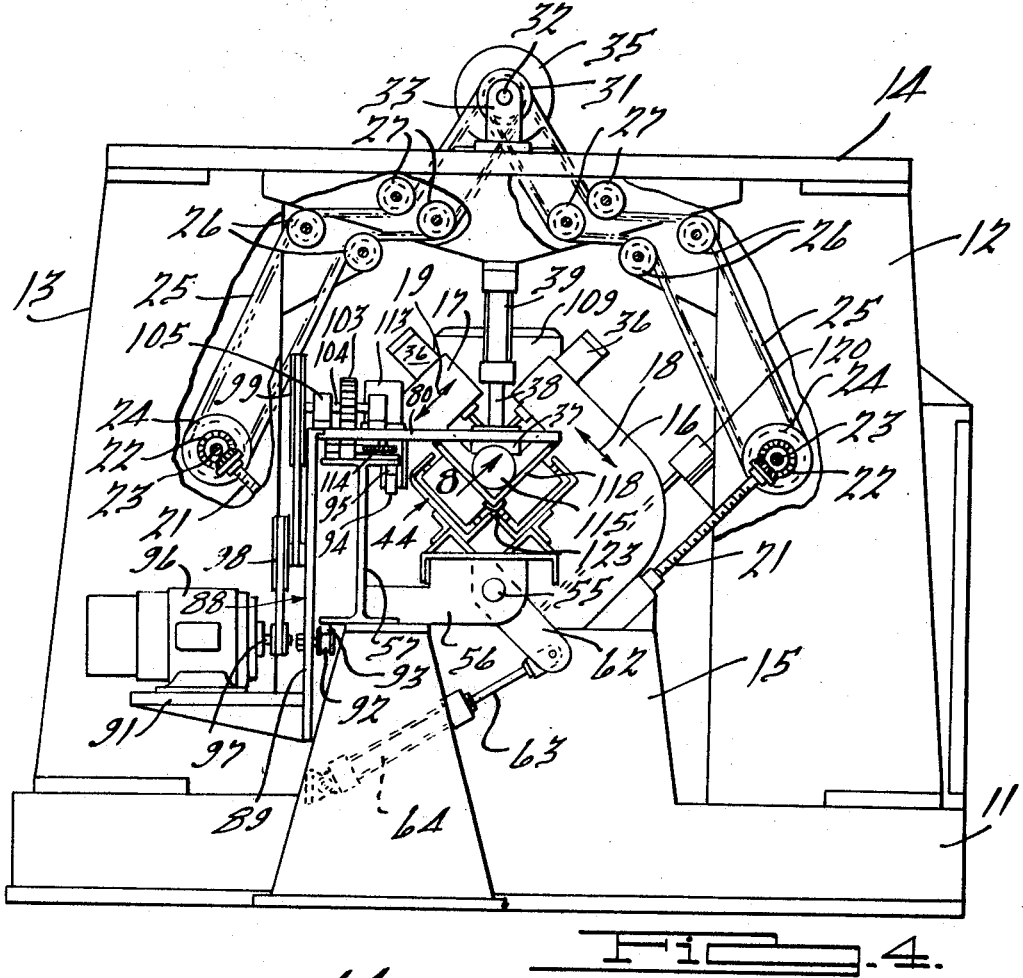
FIG. 4 is a broken view of the structure illustrated in FIG. 1, taken from the left-hand end thereof.

The machine comprises a central base 11 having uprights 12 and 13 interconnected by a top plate 14. The base has a table 15 which supports a pair of caliper-like punching devices 16 and 17, the devices 16 and 17 being adjustable along Y axes 18 and 19. The adjustment is produced by lead screws 21 driven through a set of 45° bevel gears 22. The driven gear 22 is secured to a shaft 23 having a pulley 24 thereon driven by a belt 25 to advance or retract the punching devices 16 and 17 along the Y axes thereof. The belts pass over idler pullies 26 and 27 and are driven simultaneously from a pair of pullies 31 on a shaft 32 supported on pillow blocks 33 on the plate 14. The belts 25 pass through apertures 30 in the plate. The shaft 32 is driven through a clutch 34 by a motor 35. The motor drives the punch devices 16 and 17 along their Y axes 18 and 19 to position the punch outwardly along legs 51 and 52 of an angle stock 53. Since the punching occurs seriatim, the punching devices will be moved to locate the punch of one device and after the punching operation by this device they will both be adjusted to set the other punch into its position or the same punch to another position, as the case may be, for the next punching operation.

The workpiece 53 is secured on opposite sides of the punching devices 16 and 17 by clamps 37 supported on shafts 38 and operated from rams 39. As illustrated in FIG. 8, the punch has a cylinder 36 which operates a punch holder and a punch 40 is locked therein by a lever 41 with the punch aligned with the aperture in a die 42 clamped in position by a lever 43. This permits the quick removal and replacement of the punch and guide sets.

Figure 5:
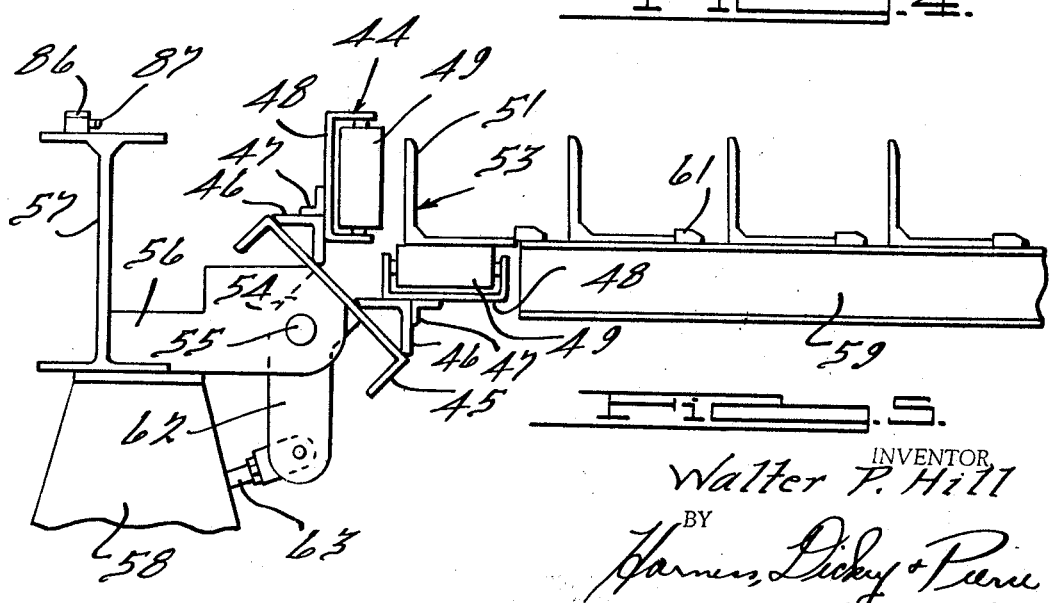
FIG. 5 is a broken sectional view of the structure illustrated in FIG. 2, taken on the line 5—5 thereof.

A feed conveyor 44 is provided forwardly of the table 15 embodying an inverted channel member 45 to the web of which angle members 46 and 47 are secured for supporting channel members 48 at right angles to each other. The channel members 48 carry spaced rollers 49 on which the legs 51 and 52 of the angle stock 53 rolls. The bottom side of the web of the channel member 45 has lugs 54 thereon which are pivotally secured by a shaft 55 to brackets 56 on an I-beam 57 mounted on supports 58. In FIG. 4, the web of the channel member 45 is shown in horizontal position with the rollers 49 at a 45° angle to a vertical plane for receiving and advancing the angle stock 53 with the legs 51 and 52 in upward position. In FIG. 5, the web of the channel member 45 is shown at a 45° angle with the rollers of one channel member 48 disposed horizontally for receiving the next adjacent angle stock 53 from a bed 59 having a series of advancing fingers 61 which engage the adjacent angle stock and advances them on the bed and the forwardmost one onto the horizontal rollers of the conveyor. The fingers 61 are then retracted and a pair of arms 62 pivoted on the shaft 55 and secured to the web of the channel 45 is actuated by a piston rod 63 extending from a ram 64 and connected to the end of the arms 62. The inward and outward movement of the piston rod tilts the web of the channel 45 to a position illustrated in FIG. 5 from and to a position illustrated in FIG. 4 for receiving an angle stock and supporting it while being advanced toward the table 15.

A receiving conveyor 66 is disposed on the rearward side of the table 15 in alignment with the conveyor 44. As the stock is cut into sections, the sections are continuously advanced on the roller conveyor 66 and when the punching and shearing of the stock is completed, the conveyor 66 is tilted to discharge the finished workpieces. The tiltable conveyor 66, as illustrated in FIG. 6, has a channel member 67 supported on brackets 68 which pivot on stub shafts 69 carried by supporting pillars 71. A downwardly extending arm 72 is actuated by a piston rod 73 of a ram 74 pivoted to a bracket 75 secured to the pillar 71. A second arm 76 may be provided on the opposite side of the channel member 67 and a bracket 77 may be secured to the pillar opposite to the bracket 75 so that the ram 74 may be pivoted to the arm 76 and bracket 77 to tilt the conveyor 66 in the opposite direction from that illustrated.

A fluid containing tank 78 is mounted on the base 11 along with a pump 79 and a motor 81. The fluid is delivered to a manifold 82 from which it is delivered to the rams 74 and the cylinder 83 of the shear, through the valves 84 and 85. The top of the I-beam 57 carries a rack 86 having upwardly presented teeth thereon and on which a rack 87 is secured having inwardly disposed teeth thereon. A carriage 88 is mounted on the top of the I-beam 57 having a vertically disposed portion 89 from which a platform 91 extends outwardly thereof. The portion 89 carries rollers 92 which engage a track 93 on the bottom face of the I-beam. A top platform 80 of the carriage 88 has a similar roller 94 which engages a track 95 on the underside of the top flange of the I-beam. The platform 91 supports a motor 96 which drives a shaft 97 through a speed reduction pulley arrangement embodying a pair of belts 98 and 99.

The shaft 97 is mounted on a pair of pillow blocks 101 on the top of the carriage for driving a gear 102 with the teeth in mesh with the teeth of the rack 86. A similar gear 103 is mounted on a shaft 104 on a pair of pillow blocks 105 with the teeth of the gear in mesh with the teeth of the rack 86 to function as an idler gear for supporting the carriage 88 and eliminate backlash from its movement. With this arrangement the carriage measures the position of the angle stock 53 relative to the punches and the cut-off die 106.

The die 106, as illustrated in FIG. 7, is mounted on a plate 107 guided in blocks 108 for vertical movement by a piston within a cylinder 109 supported in a frame 111 from the table 15. The length of stock 53 is advanced over knife blades 112 and when in position for a shearing operation the stock will be clamped and the die 106 will be moved downwardly to sever the stock over the knife blades 112 without loss of any material.

The carriage 88 supports a resolver 113 having a shaft supporting a gear 114 with the teeth thereof in mesh with the teeth of the rack 87. As the gear 114 rotates a signal is sent to a tape reader 124 for indicating the exact location of the carriage along the axis of the machine. The location of the punches on the Y axes 18 and 19 is simultaneously signaled to the tape reader 124 by a resolver 120 having a gear and rack connection to one of the slides of the punching device 16. Since both of the punching devices are moved simultaneously only the one resolver 120 need be employed.

The carriage 88 supports a ram 115 having a piston rod 116 supporting a wedge 117 at the free end. The wedge 117 rests upon an angle member 118 in position to engage a lever 119 pivoted on a boss 121 to produce a clamping force when the wedge is advanced. The forward end of the lever 119 has a clamping bar 122 which engages the end of the angle stock 53 to clamp it against a V-shaped block 123 secured to the angle member 118 and projecting forwardly thereof when the ram is advanced through the operation of a solenoid valve 90. In this manner the end of the stock is accurately positioned relative to the carriage 88 and as the carriage is advanced, the angle stock 53 will be accurately advanced therewith. As pointed out above the idler gear 103 and the teeth of the gear 102 engage the teeth of the rack 86 in such manner as to prevent any backlash occurring between the driving gear 102 and the rack.

A numerical control unit 124 is mounted on the base 11 and while it may be of any type known in the art to be suitable, the one herein illustrated is a tape reader manufactured and supplied by the General Electric Company under the designation of "Mark Century 120 N.P.C." The tape is programmed in accordance with the length of the angle stock 53 and the lengths to be punched and severed therefrom. The tape is set to zero reading each time the end of a new length of stock is advanced to engage a device 125 which provides an indication for a zero setting.

Such a device is illustrated in FIG. 1, located at the forward end of the conveyor 44. The device 125 embodies ways 126 having a carriage 127 movable upwardly and downwardly thereon by a ram 128. A plate 129 is pivoted to the carriage 127 and is disposed above the bottom of the rollers 49 of the conveyor 44 when the carriage 127 is moved to its uppermost position. In this position the forward end of the stock 53 will advance until it strikes the plate 129 to move it toward the carriage 127 in position to operate a switch 131 which impulses the tape reader 124 to indicate that the new stock has reached the zero position. Since the rear end of the stock 53 abuts against the angle member 118 of the carriage 88, an indication is given to the tape reader of the exact location of the carriage. A panel cabinet 132 carries the various switches and other control elements of the electric system.

In operation after the length of stock 53 had been advanced to the conveyor 44, as illustrated in FIG. 5, the conveyor is swung upwardly to have it disposed in conveyor position with the legs 51, 52 of the stock 53 disposed upwardly thereof. With the tape in read position, the cycle start push button is pressed by the operator. If the machine is set for automatic operation the carriage will move forwardly to have the angle member 118 abut the stock 53 and actuate the ram 115 to have the wedge 117 clamp the stock in secured position. The continued forward movement of the carriage advances the forward end of the stock 53 into engagement with the plate 129 which has been moved upwardly into the path of movement of the stock. The movement of the plate 129 will actuate a switch 131 which will set the X or horizontal axis as well as the Y axes of the punches to zero positions to conform to the tape setting which will occur at the beginning of each programmed cycle. Thereafter, the operation of the machine is controlled by the program of the tape which will stop the advancement of the stock 53 at a point where a punching operation is to occur on either one of the legs 51 and 52. In the herein disclosed arrangement both punching devices 16 and 17 are advanced or retracted the same amount each positioning thereof even though only one leg 51 or 52 is to be punched. After a predetermined advancement of the stock 53 the die 106 is actuated to cut off a length thereof. When a short piece of stock is left, the programming of the tape will punch and cut small pieces therefrom which will be collected in a tote box at the end of the shear and not on the receiving conveyor 66. Thereupon the carriage will be returned, the clamping bar 122 is released and a new length of stock in the conveyor is clamped to the V-block 123 and advanced to obtain the setting of the X and Y axes to zero positions ready for another cycle of operation.

I claim:

1. In a numerical controlled punching and shearing machine, a base, at least two punching devices disposed at an angle to each other on said base, means to adjust said punching devices along the respective legs of said angle, a shear having a die with cutting edges located on the legs of said angle, holddown means for clamping an angle workpiece during punching and shearing operations, a carriage for advancing the angle workpiece to the punching devices and shear, a tape reader, controls for the carriage, punching devices and shear actuated by the tape reader, and resolving means on said carriage and punching devices for signalling the tape reader the locations thereof.

2. In a numerical controlled machine as recited in claim 1, wherein means are provided to set the carriage and the punching devices on zero positions upon the advancement of said workpiece.

3. In a numerical controlled machine as recited in claim 2, wherein driving means are provided for said carriage and for positioning said punch devices, and means actuated by the movement of said carriage and punching devices to operate said resolving means.

4. In a numerical controlled machine as recited in claim 1, wherein an abutment member and a wedge are mounted on said carriage, and a locking bar on said member is actuated by said wedge for securing one end of the workpiece to said carriage.

5. In a numerical controlled machine as recited in claim 1, wherein the legs of the workpiece are disposed at an angle of substantially 90° relative to each other.

6. In a numerical controlled machine as recited in claim 1, wherein knives below the workpiece are in the cutting plane of the shearing die to produce the shearing operation without the loss of material.

7. In a numerical controlled machine as recited in claim 1, wherein aligned input and output conveyors located at opposite sides of the base have rollers disposed at an angle which is the same as that of the legs of the workpiece.

8. In a numerical controlled machine as recited in claim 7, wherein means are provided to tilt said conveyors to receive a workpiece and eject the finished sections therefrom.

9. In a numerical controlled machine as recited in claim 1, wherein vertically movable means are insertable in the path of the workpiece, and means on said movable means actuated when engaged by said workpiece to record a zero position for the carriage and said punching devices.

10. In a numerical controlled machine as recited in claim 1, wherein motor means are provided for driving said carriage and positioning said punching devices, and means for instantly stopping said motor means when de-energized.

References Cited

UNITED STATES PATENTS

| 3,094,028 | 6/1963 | Ausenda et al. | 83—71 |
| 3,233,485 | 2/1966 | Creamer | 83—71 |
| 3,237,495 | 3/1966 | Creamer | 83—71 |
| 3,285,111 | 11/1966 | Creamer | 83—71 |

WILLIAM S. LAWSON, Primary Examiner

U.S. Cl. X.R.

83—102, 159, 213, 255, 452